United States Patent [19]

Shepherd

[11] 4,302,986
[45] Dec. 1, 1981

[54] PLASTIC HUB TORSIONAL VIBRATION DAMPER

[75] Inventor: Michael Shepherd, Indianapolis, Ind.
[73] Assignee: Wallace Murray Corporation, New York, N.Y.
[21] Appl. No.: 875,500
[22] Filed: Feb. 6, 1978

Related U.S. Application Data

[63] Continuation of Ser. No. 667,975, Mar. 18, 1976, abandoned.

[51] Int. Cl.³ ............................................. F16F 15/10
[52] U.S. Cl. ................................................... 74/574
[58] Field of Search .......................... 74/574; 310/74

[56] References Cited

U.S. PATENT DOCUMENTS

| 1,918,249 | 7/1933 | Dashefsky | 74/574 X |
| 1,961,679 | 6/1934 | Walti | 64/1 V |
| 2,580,839 | 1/1952 | Riopelle | 74/574 |
| 2,898,777 | 8/1959 | Boehm | 74/574 |
| 3,264,898 | 8/1966 | O'Connor | 74/574 |

FOREIGN PATENT DOCUMENTS

| 2130664 | 12/1971 | Fed. Rep. of Germany | 74/574 |
| 2130089 | 10/1972 | Fed. Rep. of Germany | 74/574 |
| 2527046 | 12/1976 | Fed. Rep. of Germany | 74/574 |
| 2538480 | 3/1977 | Fed. Rep. of Germany | 74/574 |
| 736808 | 9/1955 | United Kingdom | 74/574 |

*Primary Examiner*—Samuel Scott
*Assistant Examiner*—Wesley S. Ratliff, Jr.
*Attorney, Agent, or Firm*—Thomas J. Greer, Jr.

[57] ABSTRACT

An elastomer torsional vibration damper having a hub of low mass. The hub is preferably formed of a rigid plastic such as a phenol-formaldehyde, or of glass filled nylon. According to the invention, the hub is formed of a material having a minimum specific volume of 12 cubic inches per pound to thereby reduce the parasitic inertia of the torsional vibration damper.

6 Claims, 7 Drawing Figures

PLASTIC HUB TORSIONAL VIBRATION DAMPER

This is a Continuation of application Ser. No. 667,975 filed Mar. 18, 1976 now abandoned.

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, Sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing induced, excitation frequency of the engine. According to present theory of elastomer vibration dampers, the torsional vibrational energy transmitted to the crankshaft by the action of the pistons is converted into heat in the elastomer. The damper may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces often result in torsional vibrations in the shaft. In a typical instance of torsional vibration, an engine crankshaft turning at a rate of 3000 r.p.m. simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper also prevents breakage of the crankshaft as well as inhibiting vibration of various other components of the internal combustion engine.

Prior torsional vibration constructions of the type having a hub, elastomer member, and inertia member or ring have generally employed materials of relatively high density for both the hub and the inertia member. The relatively high density and accompanying relatively high damping ability of the inertia member on account of its mass is a desirable feature; the hub employed only more or less as a coupling between the shaft and the inner radial portion of the elastomer annulus. However, the use of high density material such as cast iron for the hub may result in undesirable effects. Thus whenever any rotary mass, such as a torsional vibration damper, is added to the crankshaft of an engine, the resonant frequency of that crankshaft is lowered. Such lowering may bring critical resonant vibration orders of the crankshaft near or within the operating range of speeds of the engine.

An internal combustion engine has, in general, an operating range, as for example, from 1000 to 4500 r.p.m. Within this range there is a corresponding range of firing induced, excitation frequencies. These excitation frequencies, as earlier noted, induce torsional vibrations on the crankshaft. If a natural resonant frequency of the crankshaft is above the excitation frequencies of the engine within the normal operating speed range, large torsional amplitudes in the crankshaft will in general not occur. Contrariwise, if a resonant frequency of the crankshaft is within the engine firing frequencies, large angular vibration amplitudes may arise.

It will now be apparent to the reader that the inertia of a rotary mass fixed to the crankshaft, for the purpose of completing a typical damper assembly, should be as small as possible. In this way, the crankshaft resonant frequencies may, in certain applications, be maintained as far as possible from the engine firing related frequencies.

It has been discovered that a particular plastic composition possesses the necessary strength for use as a hub on such a damper. At the same time, the material is of sufficient lightness as to maintain the noted frequency separation.

According to another aspect of the invention, the use of a hub material of certain strength and lightness characteristics permits a damper design which lessens the amplitude of torsional vibrations of a crankshaft within the operating range of an internal combustion engine.

Figure 1:
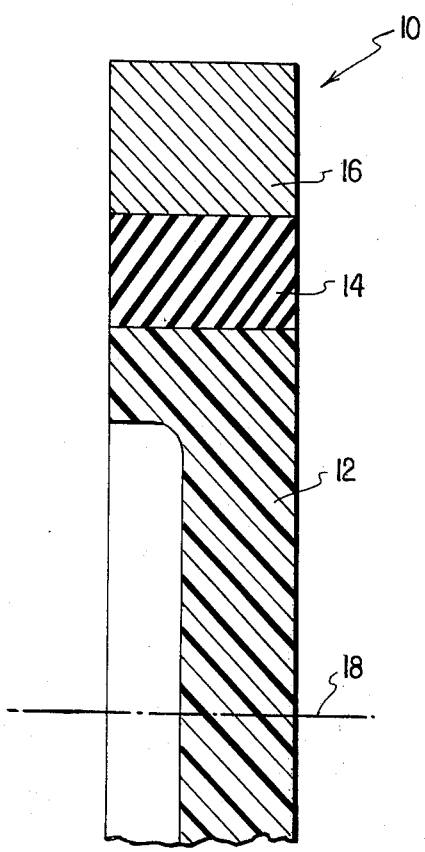
FIG. 1 is a partial axial cross-section of a typical torsional vibration damper.

Referring now to FIG. 1 of the drawings, the numeral 10 denotes a typical torsional vibration damper of the type having a hub 12 whose outer periphery engages the inner periphery of an elastomer annulus 14 and having an outer inertia member or ring 16 whose inner periphery engages the outer periphery of annulus 14. The hub 12 is suitably coupled to a shaft such as the crankshaft of an internal combustion engine whose axis of rotation is denoted by the numeral 18. By custom and practice in the art, both the hub 12 and the inertia member 16 have generally been formed of metal such as cast iron. The hub is illustrated as of plastic.

Figure 2:
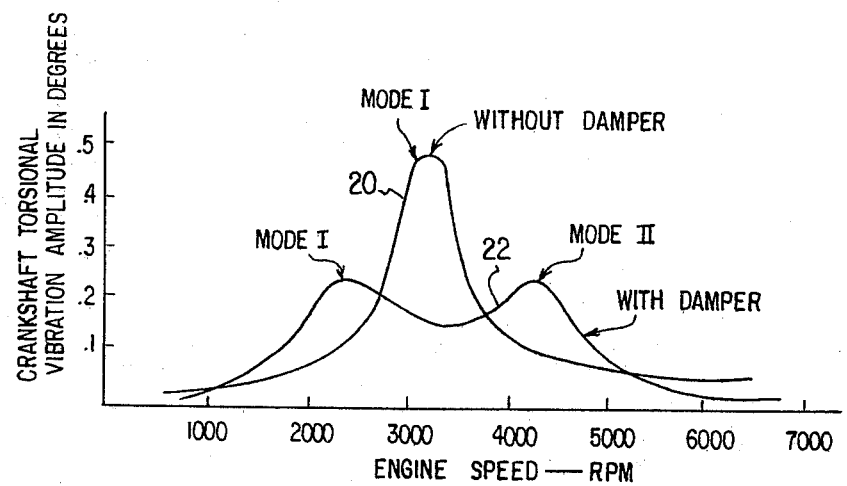
FIG. 2 illustrates the action of the addition of a torsional vibration damper of the type shown in FIG. 1 on a resonant frequency response of the typical crankshaft in an internal combustion engine, the ordinate showing torsional vibration amplitude being in tenths of a degree.

Referring now to FIG. 2 of the drawings, the vibrational response of a typical crankshaft of an internal combustion engine without a torsional vibration damper is illustrated. At an engine speed of slightly over 3,000 r.p.m., the particular crankshaft corresponding to curve 20 will go into a first or main resonant mode of torsional vibration, designated as Mode I. At speeds above and below this speed, the torsional vibration amplitudes will be relatively small. Other modes will occur, but are not illustrated on curve 20 because of their relatively small amplitudes and because they occur at speeds beyond the indicated speeds. The other curve 22 illustrates the vibrational behavior of the crankshaft when a typical prior art damper is attached thereto. The second curve exhibits two resonant frequencies designated as Mode I and Mode II which occur at the indicated speeds within the shown speed range. Again, additional modes will occur, such as Modes III, IV, etc., but at speeds well beyond the illustrated scale. It will be seen that these two torsional resonant frequencies occur at about 2200 r.p.m. and 4300 r.p.m. in the example given. Thus, if the engine speed is around 2200 r.p.m. or around 4300 r.p.m., the crankshaft will undergo torsional vibrations of a greater angular amplitude, than other speeds. However, it will be apparent that even so, these vibrations are of an amplitude (in the example given) of approximately one-half of what would have occurred, at resonance, of the crankshaft without the damper. Further, the torsional vibration damper of the general type illustrated in FIG. 1 has its own resonant frequency. When attached to a crankshaft the dynamic behavior of the crankshaft-damper assembly is changed so that instead of a single resonant frequency, two resonant frequencies are encountered, as illustrated.

Figure 3:
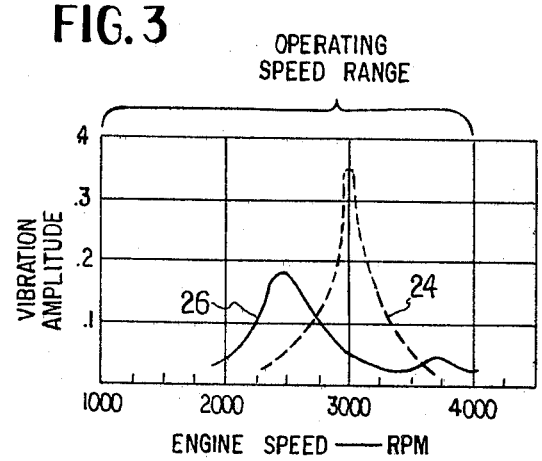
FIG. 3 is a view similar to FIG. 2 and illustrates a torsional vibration damper tuned to a frequency above an optimum frequency.
Figure 4:
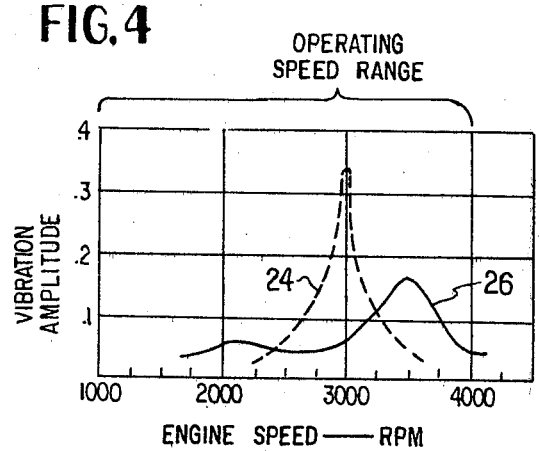
FIG. 4 is a view similar to FIG. 3 and illustrates an arrangement of a torsional vibration damper tuned to a frequency below an optimum frequency.

Referring now to FIGS. 3 and 4 of the drawings, a similar plot illustrates how a torsional vibration damper of the general type shown at FIG. 1 may be incorrectly tuned in a particular application. The curves 24 illustrate, in both FIGS. 3 and 4, a sixth order of vibration of the crankshaft at approximately 3,000 r.p.m. The curves 26 illustrate the behavior of the crankshaft after a torsional vibration damper has been placed on it. In FIG. 3, the damper has, however, been tuned to a frequency above the optimum, while at FIG. 4 the damper has been tuned to a frequency below the optimum.

Figure 5:
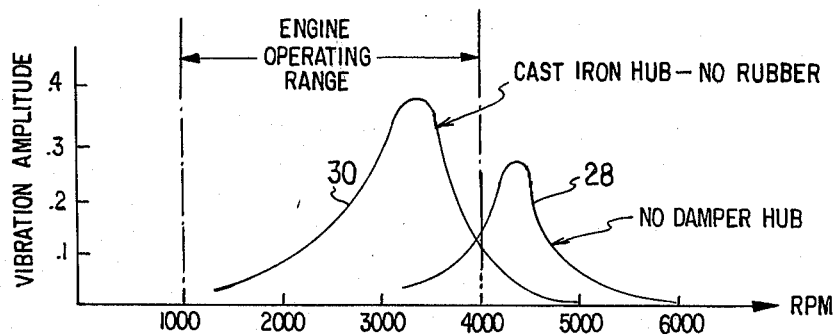
FIG. 5 is a view similar to FIG. 1 and illustrates the effect on torsional vibration behavior of the addition of a typical cast iron hub to a crankshaft.

Referring now to FIG. 5 of the drawings, the numeral 28 denotes the torsional vibration vs. engine speed characteristic of a crankshaft with no damper attached. In the example given, the characteristics of the crankshaft are such that its main resonant frequency occurs at an engine speed of approximately 4300 r.p.m. which speed is beyond the normal engine operating range. The curve 28 may be the first harmonic, with several other harmonics, however, occurring within the engine operating range. The curve denoted by the numeral 30 indicates a similar characteristic, changed however by the addition of a cast iron damper hub (without the elastomer or inertia ring) to such a crankshaft. The additional mass on the crankshaft causes the resultant crankshaft-hub composite assembly to now have a lower natural resonant frequency, now within the operating range of the engine. FIG. 5 demonstrates that the addition of a rotary mass to a crankshaft will decrease its natural resonant frequency.

Figure 6:
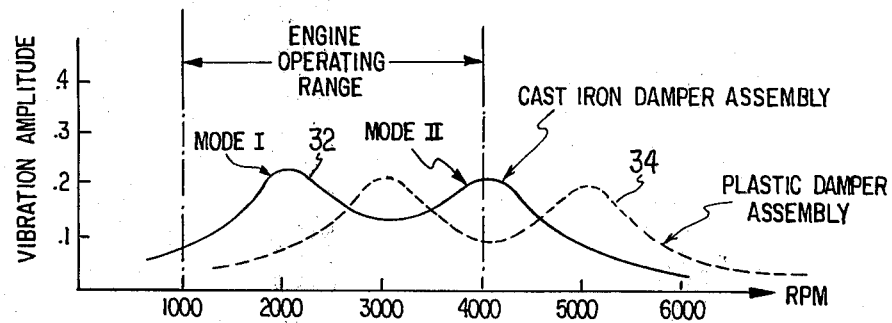
FIG. 6 is a view similar to FIG. 2 and illustrates the change in frequency response of a crankshaftdamper assembly with the use of a damper employing a plastic hub of this invention.

Referring now to FIG. 6 of the drawings, the curve 32 denotes a typical crankshaft torsional frequency response curve with a cast iron hub and damper assembly of the general type shown at FIG. 1 of the drawings. It is seen that its first mode (peak) occurs within the engine operating range and, in the example given, its second mode (peak) occurs at the upper range of engine operation speed. The curve denoted by the numeral 34 indicates a corresponding response with the variant, however, that the hub 12, instead of being fashioned of a relatively high density material such as cast iron, is fashioned from a plastic composition having requisite strength and lightness in accordance with the practice of this invention.

From a consideration of FIG. 5, the reader will be in a position to comprehend that the shift between curves 32 and 34 of FIG. 6 is caused by the greater of the inertia (i.e., density) conventional cast iron hub and inertia ring torsional vibration damper assembly. Thus, curve 34 exhibits only a single resonant frequency at a speed within the engine operating range, in the example given. The second resonant frequency of curve 34 occurs outside of the operating range.

Figure 7:
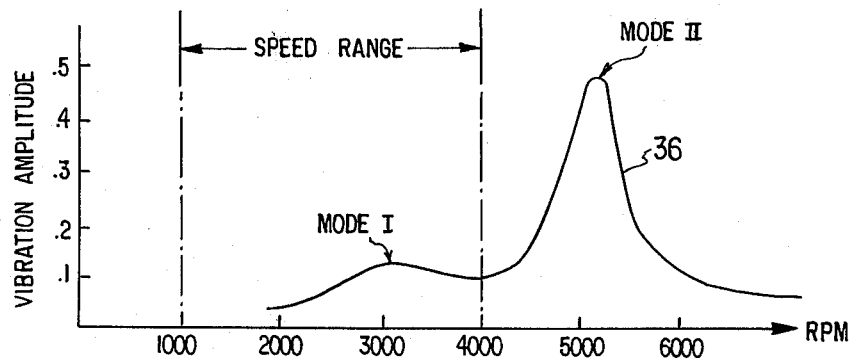
FIG. 7 is a view similar to FIG. 5 and illustrates an optimum manner of tuning the plastic hub vibration damper of this invention.

FIG. 7 illustrates the torsional vibration amplitude vs. engine speed behavior for a crankshaft provided with a plastic hub damper of the type shown at FIG. 1 of the drawings. By suitably tuning the damper, the crankshaft-damper assembly response will exhibit the indicated shape. It is seen that the first mode or peak occurs at about 3,000 r.p.m. and is of relatively low vibrational amplitude. The second mode, while of unacceptably high amplitude, lies outside of the speed range of the engine (above 5000 r.p.m.) and accordingly is not a limiting factor in damper performance. With the use of a cast iron (conventional) hub, it would not be possible to tune a damper so that it exhibited the characteristics indicated at FIG. 7, namely, that the high amplitude, second mode could be made to fall outside of the operating range of the engine.

The hub may be formed from a material having the following minimum physical and/or chemical properties:

Specific volume of 12 in.$^3$/lb

Tensile strength of 8000 psi

Continuous no load service temperature of at least 300° F.

An example of a suitable material is a phenolformaldehyde resin, currently available under the trademark Durez, No. 29237, made by Hooker Electrochemical Company. The use of a plastic material also facilitates ease in fabrication, such as injection molding to form fins, apertures, and the like for heat dissipation.

A specific example of the utility of the invention may be seen from the following comparison data. A certain torsional vibration damper of the type shown at FIG. 1 of the drawings weighed about 8.4 pounds, the hub and inertia members both being formed of cast iron. The outside diameter of the inertia member was about 6.6 inches, the outside diameter of hub member was about 5.0 inches, and the radial thickness of the elastomer annulus was about one-tenth inch. By forming the hub of Durez No. 29,237, the inertia member still being formed of cast iron, the weight of the damper assembly was reduced to about 5.9 pounds. The improved performance of this second damper over that of the first-mentioned damper is seen from the following computer simulated analysis, i.e., a computer prediction or forecast of damper behavior. Such computer simulated analysis has been found to be within 10% of actual experimental results.

The engine to which the computer simulation was applied was of eight cylinders having 370 cubic inch displacement, 190 B.H.P., the cylinders each of a bore of 4.04 inches and a stroke of 3.60 inches, the engine having a BMEP of 122.0 and an operating speed range from 600-4500 r.p.m. The data is given for the 3.0 and 4.0 orders only, these being, usually, critical orders for a V-8 type engine. The data is for three cases, namely, for a crankshaft not provided with a damper, for a cast iron damper damped crankshaft, and for a Durez 29,237 plastic hub damper damped crankshaft.

TABLE 1hz,1/32

| Bare Crankshaft | | |
| --- | --- | --- |
| Mode 1 Order | Speed (R.P.M.) | Mode Freq. = 1436.6 rad/sec D.A.-Deg. |
| 3 | 4573 | 0.357 |
| 4 | 3429 | 0.564 |
| Mode 2 Order | Speed (R.P.M.) | Mode Freq. = 2863.3 rad/sec D.A.-Deg |
| 3 | 9114 | 0.515 |
| 4 | 6835 | 1.830 |
| Crankshaft With Cast Iron Hub Damper | | |
| Mode 1 Order | Speed (R.P.M.) | Mode Freq. = 1063 rad/sec D.A.-Deg. |
| 3 | 3385 | 0.175 |
| 4 | 2539 | 0.085 |
| Mode 2 Order | Speed (R.P.M.) | Mode Freq. = 1762 rad/sec D.A.-Deg. |
| 3 | 5610 | 0.141 |
| 4 | 4207 | 0.181 |
| Crankshaft With Plastic Hub Damper | | |
| Mode 1 Order | Speed (R.P.M.) | Mode Freq. = 1106 rad/sec D.A.-Deg. |
| 3 | 3521 | 0.112 |
| 4 | 2641 | 0.064 |
| Mode 2 Order | Speed (R.P.M.) | Mode Freq. = 2080 rad/sec D.A.-Deg. |
| 3 | 6622 | 0.281 |
| 4 | 4966 | 0.423 |

Recalling that the engine operating range is from 600 to 4500 r.p.m., the torsional amplitude in DDA (double-amplitude torsional deflection, in degrees), as shown at the right column, increase in Mode 2 for both the third and fourth orders with the plastic hub damper over the cast-iron hub damper is of no practical significance. The engine not attaining the speeds 6622 r.p.m. and 4966 r.p.m. at which these angular displacements are predicted to occur, these higher angular displacements cannot take place.

In addition to the use of Durez 29,237 for the hub, the hub may also be formed of glass-filled nylon having the requisite strength and specific volume.

What is claimed is:

1. A torsional vibration damper of the type having a single outermost inertia ring secured to a central hub by means of a single, radially intermediate annular elastomer member, the hub coupled to a rotary shaft of an internal combustion engine for the purpose of damping torsional vibrations, the internal combustion engine operating within a range of engine speeds, the damper having two resonance peaks, the improvement comprising, forming the hub of a material of lesser density than the material from which the inertia member is formed whereby one of the two resonance peaks of the damper occurs beyond the upper range of engine speeds, and the other resonance peak occurs within the engine operating range and is of lesser amplitude than the said peak occurring outside of the engine operating range.

2. The torsional vibration damper of claim 1 wherein the hub is formed of a material having a minimum specific volume of 12 cubic inches per pound, a minimum tensile strength of 8,000 pounds per square inch, and a continuous no load service temperature of at least 300° F.

3. The damper of claim 2 wherein the hub is formed of a phenolic resin.

4. The damper of claim 3 wherein said phenolic resin is a phenol-formaldehyde.

5. The damper of claim 2 wherein said hub is formed of glass-filled nylon.

6. The damper of claim 2 wherein the inertia member is formed of cast iron.

* * * * *